(12) United States Patent
Lou et al.

(10) Patent No.: US 9,965,529 B2
(45) Date of Patent: May 8, 2018

(54) MAINTAINING SEARCH CONTEXT

(75) Inventors: JinYu Lou, Beijing (CN); Chen Ding, Beijing (CN); David F. Huynh, San Francisco, CA (US)

(73) Assignee: Google LLC, Mountain View, CA (US)

( * ) Notice: Subject to any disclaimer, the term of this patent is extended or adjusted under 35 U.S.C. 154(b) by 154 days.

(21) Appl. No.: 14/398,415

(22) PCT Filed: May 2, 2012

(86) PCT No.: PCT/CN2012/074994
§ 371 (c)(1),
(2), (4) Date: Apr. 13, 2015

(87) PCT Pub. No.: WO2013/163801
PCT Pub. Date: Nov. 7, 2013

(65) Prior Publication Data
US 2015/0213094 A1  Jul. 30, 2015

(51) Int. Cl.
*G06F 17/30* (2006.01)
*G06F 3/0485* (2013.01)

(52) U.S. Cl.
CPC ...... *G06F 17/30554* (2013.01); *G06F 3/0485* (2013.01); *G06F 17/30424* (2013.01); *G06F 17/30696* (2013.01); *G06F 17/30899* (2013.01); *G06F 17/30991* (2013.01)

(58) Field of Classification Search
USPC ........................................ 707/706, 722, 759
See application file for complete search history.

(56) References Cited

U.S. PATENT DOCUMENTS

| | | | |
|---|---|---|---|
| 7,181,438 B1 | 2/2007 | Szabo | |
| 8,239,399 B2* | 8/2012 | Govani | G06F 17/30864 707/759 |
| 2007/0038616 A1* | 2/2007 | Guha | G06F 17/30672 |
| 2009/0216760 A1* | 8/2009 | Bennett | G06F 17/30864 |
| 2011/0083167 A1* | 4/2011 | Carpenter | G06F 17/30563 726/4 |
| 2011/0137881 A1* | 6/2011 | Cheng | G06F 17/3087 707/706 |
| 2011/0258049 A1* | 10/2011 | Ramer | G06F 17/30867 705/14.66 |
| 2011/0296133 A1* | 12/2011 | Flynn | G06F 11/1048 711/171 |

FOREIGN PATENT DOCUMENTS

| | | |
|---|---|---|
| CN | 102298616 | 12/2011 |
| JP | 2005165986 | 6/2005 |
| JP | 2011186876 | 9/2011 |

OTHER PUBLICATIONS

Office Action issued in Chinese Application No. 201280074477.3, dated Apr. 1, 2017, 11 pages (English Translation).
(Continued)

*Primary Examiner* — Hung T Vy
(74) *Attorney, Agent, or Firm* — Fish & Richardson P.C.

(57) ABSTRACT

Methods and systems are provided for providing search results while maintaining search context. A search system may display a plurality of links related to a received search query, wherein the links are all of the same entity type. The system may display sets of search results related to the plurality of links, while continuing to display the plurality of links.

30 Claims, 13 Drawing Sheets

(56) References Cited

OTHER PUBLICATIONS

Office Action issued in Chinese Application No. 201280074477.3, dated Nov. 16, 2017.
International Search Report and Written Opinion in International Application No. PCT/CN2012/074994, dated Feb. 7, 2013, 7 pages.
Office Action issued in Chinese Application No. 201280074477.3, dated Feb. 7, 2018, 7 pages (with English translation).

* cited by examiner

900

MAINTAINING SEARCH CONTEXT

BACKGROUND

The present disclosure relates to a search system. Conventional techniques for exploring multiple sets of search results include following links to discrete web pages. Typically, browsing between sets of search results may include navigating between pages with, for example, browser tabs or a "forward" and "back" button.

SUMMARY

Methods and systems are provided for providing search results while maintaining search context.

In some implementations, a computer implemented method for providing search results includes receiving a search query for an entity. A first plurality of links is displayed, using one or more processors, in an information area of a display screen corresponding to first related entities that are related to the entity. When a link corresponding to one of the first related entities of an entity type from the first plurality of links is selected, a second plurality of links is displayed, using one or more processors, in a related entity area of the display screen corresponding to second related entities that are related to the entity and that are all of the entity type. When a link corresponding to one of the second plurality of links in the related entity area of the display screen is selected, a third plurality of links is displayed, using one or more processors, in a search result area, wherein the third plurality of links is related to the entity selected from the second plurality of links, and wherein the second plurality of links remain in the related entity area of the display screen.

In some implementations, a computer implemented method for providing search results includes receiving a search query for a list of entities all of an entity type. A plurality of links is displayed, using one or more processors, in a related entity area of a display screen corresponding to a plurality of entities of the entity type that belong to the list of entities. When one of the plurality of links is selected, data related to an entity corresponding to the one of the plurality of links is displayed, using one or more processors, in another area of a display screen, wherein the plurality of links remain in the first area.

In some implementations, a system comprising one or more computers is provided. The system receives a search query for an entity. The system displays a first plurality of links, using one or more processors, in an information area of a display screen corresponding to first related entities that are related to the entity. When a link corresponding to one of the first related entities of an entity type from the first plurality of links is selected, the system displays a second plurality of links, using one or more processors, in a related entity area of the display screen corresponding to second related entities that are related to the entity and that are all of the entity type. When a link corresponding to one of the second plurality of links in the related entity area of the display screen is selected, the system displays a third plurality of links, using one or more processors, in a search result area, wherein the third plurality of links is related to the entity selected from the second plurality of links, and wherein the second plurality of links remain in the related entity area of the display screen.

In some implementations, a system comprising one or more computers is provided. The system receives a search query for a list of entities all of an entity type. The system displays a plurality of links, using one or more processors, in a related entity area of a display screen corresponding to a plurality of entities of the entity type that belong to the list of entities. When one of the plurality of links is selected, the system displays data related to an entity corresponding to the one of the plurality of links, using one or more processors, in another area of a display screen, wherein the plurality of links remain in the first area.

DETAILED DESCRIPTION OF THE FIGURES

Figure 1:
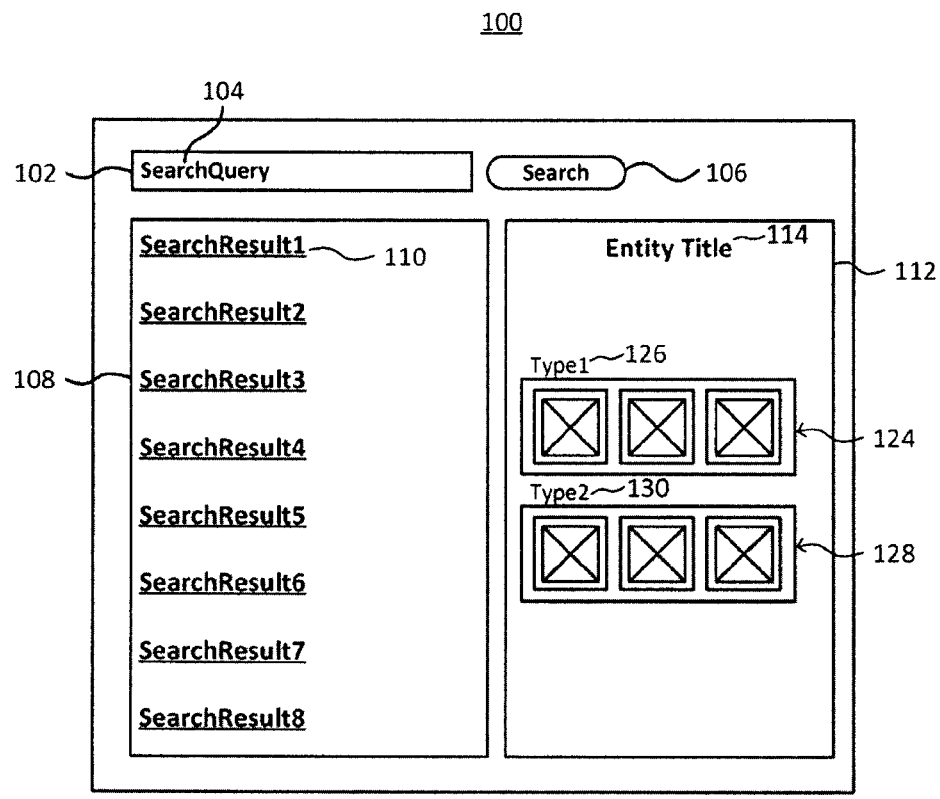
FIG. 1 shows an exemplary user interface in accordance with some implementations of the present disclosure.

The present disclosure is directed towards systems and methods for displaying search results, and more particularly for maintaining search context within a browser.

In some implementations, a search system, in addition to generating search results, generates links to additional sets of search results. In an example, the search system receives from the user a search query about a particular actor. The search system displays movies, TV shows, and books associated the actor. In response to a selection of one of the TV shows, the search system displays links to other TV shows starring that actor.

In some implementations, the search system allows a user to explore one or more of multiple sets of search results while providing access to each of the multiple sets of search results. In an example, where the search system displays links to a particular actor's movies, the search system displays a set of search results in response to receiving a selection of a link, while continuing to display the links to the movies. The search system may then receive a selection of a link to a second movie and may display a set of search results for the second movie, while still continuing to display the links to the movies. In some implementations, the constant links may be displayed as a scrollable set of thumbnail images in a particular portion of the display screen. In an example, a navigation bar is displayed near the top of the screen above the sets of search results.

In some implementations, the search system receives a search query for a topic (also referred to herein as an "entity"). In response, the search system displays information related to the entity that includes links to several types of entities. As used herein, types refer to defining characteristics or groupings of a topic or entity. For example, "dog" and "cat" are both entities of the type "pet." In another example, "The Great Gatsby" and "The Catcher in the Rye" are entities of the type "book." For example, where the search query is the name of an author, the displayed links may include books, screenplays, and short stories by the author. In some implementations, the search system may receive a selection of one of the displayed types, and may display links to several sets of search results of the selected type. In another implementation, the search system receives a search query that implicitly or explicitly indicates a type. In an example, the search system receives the search query "Movies with Tom Hanks." In some implementations, the search system displays several links of the type indicated in the received search query without receiving further input. Both implementations may include a scrollable navigation bar, as described above, to display constant links to sets of search results. In some implementations, the search system continues to display the links to several sets of search results while the search results are explored.

In some implementations, the search system provides a user with the ability to refine or adjust the entities. For example, the search system may provide filters (e.g., in the form of an interactive user interface element) to reduce the number of entities or change the selection of entities. For example, where the entities relate to "highest mountains," filters may include "mountains in North America," "mountains in the southern hemisphere," "mountains below 10,000 feet," any other suitable refinement, or any combination thereof.

In some implementations, the search system provides additional information related to the entities. For example, the search system may provide images, a brief description, a detailed description, any other suitable information, or any combination thereof. In some implementations, the search system provides the additional information to help the user select a desired entity, for example, images corresponding to the entities.

The following description and accompanying FIGS. 1-13 provide additional details and features of some implementations of the search system.

FIG. 1 shows exemplary user interface 100 in accordance with some implementations of the present disclosure. In some implementations, user interface 100 illustrates exemplary content displayed in a horizontal carousel format following a search of the internet as described below in step 404 of FIG. 4. In some implementations, user interface 100 includes search result area 108 and information area 112.

In some implementations, user interface 100 includes search query box 102 containing received search query "SearchQuery" 104. As described below, the search query includes, for example, the search query received in step 402 of FIG. 4.

In some implementations, search results area 108 includes the search results related to search query "SearchQuery" 104. Search results area 108 may include, for example "SearchResult1" 110. In some implementations, "SearchResult1" 110 includes, for example, a link to a target web page, a brief description of the target of the link, contextual information related to the target of the link, an image related to the target of the link, video related to the target of the link, any other suitable information, or any combination thereof. In some implementations, contextual information includes a time stamp, a date stamp, historical information, a link to cached versions of content, a link to related content, a link to social medial content, an indicator of the relevance of the link, any other suitable contextual information, or any combination thereof. In some implementations, search results area 108 includes other elements not shown, such as a scroll bar, "next page" links, statistical information, contextual information, other suitable content, or any combination thereof.

In some implementations, information area 112 includes information related to an entity received in a search area. In some implementations, information area 112 links to related entities, links to websites, links other content, any other suitable content or information, or any combination thereof. In some implementations, information area 112 includes search results, includes a set of search results separate from those in search results area 108, or any combination thereof. In some implementations, information area 112 fully or partially includes search results area 108, is separate from search results area 108, or any combination thereof.

In some implementations, information area 112 includes entity title 114, indicating the name of the entity about which information is displayed. In some implementations, information area 112 includes information area links 124 of a type indicated by type heading 126 and information area links 128 of a type indicated by type heading 130. In some implementations, links of a type are links to entities associated with that type. For example, links of the type "U.S. City" may be links to the entities "San Francisco," "New York," and "Los Angeles." As described below, in some implementations the information area links may include the first plurality of links displayed in step 404 of FIG. 4. In some implementations, information area 112 includes a list of links. The list of links may, for example, be sorted or grouped by type.

In an example, where the identified entity is the Empire State Building, entity title 114 may include the text "Empire State Building." Information area links 124 may include other skyscrapers, with type label 126 "Skyscrapers" and thumbnail links to the "Sears Tower," the "Burj Khalifa," and the "Petronas Tower." Information area links 128 may include other historic buildings in New York City, with type label 130 "Historic New York" and thumbnail links to the "Chrysler Building," the "Statue of Liberty," and the "Metropolitan Opera House."

Figure 2:
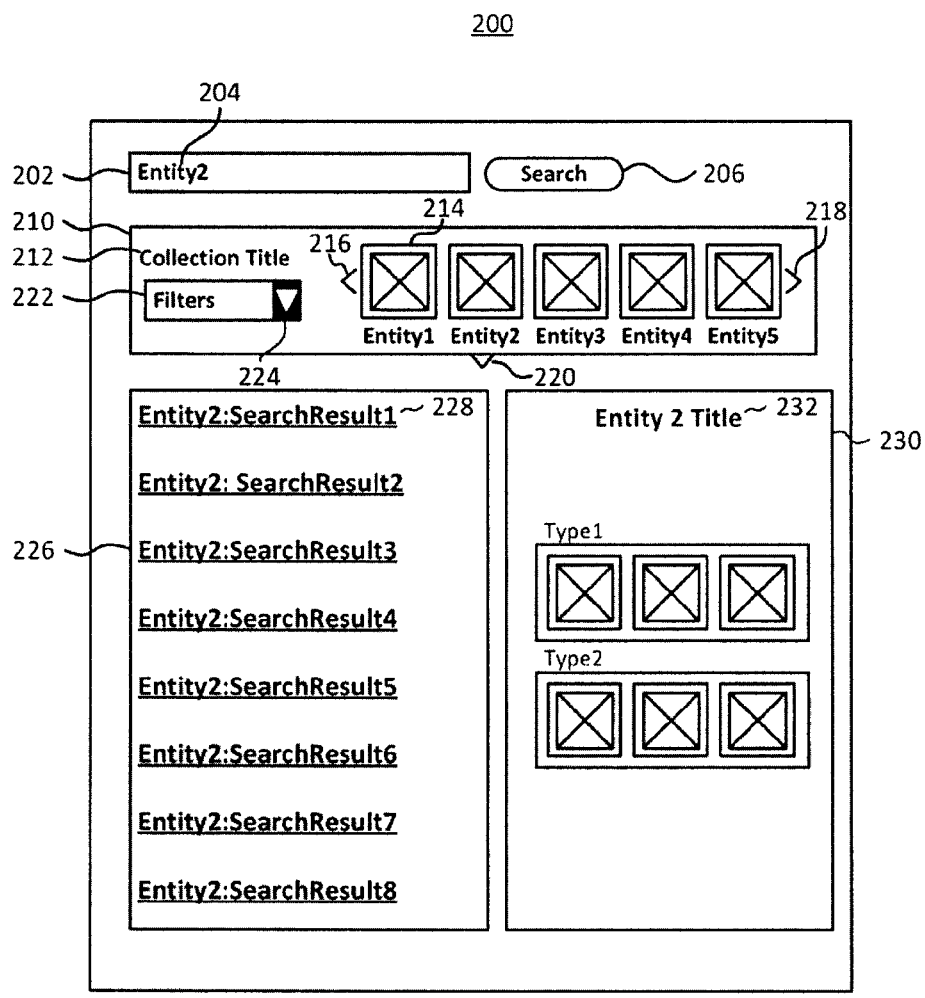
FIG. 2 shows another exemplary user interface in accordance with some implementations of the present disclosure.

FIG. 2 shows exemplary user interface 200 in accordance with some implementations of the present disclosure. In some implementations, user interface 200 illustrates exemplary content displayed in response to receiving a selection of an information area link. In some implementation, the search system receives a selection of one of the thumbnail links of information area links 124 of FIG. 1, as described below in step 406 of FIG. 4.

In some implementations, user interface 200 includes related entity area 210, search results area 226, and information area 230. In some implementations, user interface 200 includes search query box 202 containing search query "Entity2" 204. In some implementations, the search query is, for example, related to a link selected from the information area links as described below in step 406 of FIG. 4. In some implementations, the search system automatically updates the content displayed within search box 202 following the receipt of input indicating a selection of a link. In some implementations, the search system receives user input indicating a selection of search button 206, indicating a desired search. The search button may be activated using, for example, input received using a mouse or touchpad.

In some implementations, related entity area 210 includes a carousel of related entity area links. In some implementations, the links include the second plurality of links described in step 408 of FIG. 4, the plurality of links described in step 804 of FIG. 8, any other suitable links to related entities, or any combination thereof. In some implementations, related entity area 210 includes collection title 212 indicating, for example, the name of the entity and/or type to which the links in related entity area 210 are related. In some implementations, related entity area 210 includes related entity area links such as "Entity1" link 214. In some implementations, the related entity area links are all of the same entity type. "Entity1" link 214 may be a text link, image thumbnail link, any other suitable type of link, or any combination thereof. In some implementations, the search system may receive a selection of one of the related entity area links displayed in related entity area 210, as described below in step 410 of FIG. 4.

In some implementations, the links of related entity area 210 are scrollable to display more links. For example, the search system may receive input at arrow 216 and arrow 218 from the user indicating a desire to scroll the displayed links to the left or right. In some implementations, the search system receives input indicating a scroll action from clicking and dragging the displayed links, selecting a scroll arrow, selecting a scroll bar, using keyboard input, by any other suitable input, or any combination thereof. In some implementations, scrolling includes three-dimensional display effects.

It will be understood that the particular horizontal scrollable arrangement of links in related entity area 210 is merely exemplary and that the search system may display links in any suitable arrangement. For example, the search system may arrange links vertically, in a grid, in a matrix, in a list, in any other suitable arrangement, or any combination thereof. Links may be scrollable, paginated, of a fixed or selectable number, grouped in any other suitable technique, or any combination thereof.

In some implementations, indicator 220 indicates a particular entity in related entity area 210. The particular entity may be the entity selected from an information area, for example, from information area links 124 of FIG. 1 or from information area links 240. In some implementations, the search system updates the configuration and/or location of indicator 220 in response to receiving a selection of one of the links displayed in related entity area 210 to indicate a new selection, as described below in step 410 of FIG. 4. In some implementations, indicator 220 includes an arrow, highlighting, shadowing, enlarging, shrinking, illuminating, any other suitable reconfiguration or icon, or any combination thereof.

In some implementations, filter 222 includes filters to refine or adjust the particular entities displayed in the related entity area. In some implementations, filter 222 includes a pull down menu activated by pull down arrow 224. In some implementations, filter 222 includes particular properties or parameters related to the entities displayed in the related entity area. For example, where the entities are of the type "U. S. Presidents," filters of filter 222 may include the years the president served, the number of terms held, or the political party for which they served. In some implementations, the search system updates the available filters when the links in related entity area 210 are updated, when search results are updated, when links are selected in information area 230, when a filter is selected, at any other suitable time, or any combination thereof. It will be understood that the pull down menu display of filter 222 is merely exemplary and that the search system may use any suitable arrangement for displaying filters. For example, filters may be displayed in a static list, expandable list, grid, matrix, any other suitable arrangement, or any combination thereof. In some implementations, the search system receives a search query for a particular filter in, for example, a second search box.

In some implementations, search results area 226 contains search results related to a selected related entity. In an example, the search system displays search results related to the link selected from information area links 124 of FIG. 1 in information area 112 of FIG. 1, as described below in step 406 of FIG. 4. In some implementations, search results area 226 includes search results related to the search query displayed in search query box 202, such as search query "Entity2" 204. In an example, search results area 226 contains search result "Entity2:SearchResult1" 228, where "Entity2:SearchResult1" 228 is the first search result related to a search query "Entity2." In some implementations, search result 228 includes a link, brief description, images, video, audio, contextual information, any other suitable search result content, or any combination thereof. In some implementations, search results area 226 contains any suitable number of search results. In some implementations, search results are scrollable, paginated, arranged by any other suitable technique, or any combination thereof. In some implementations, the search system selects a particular technique of displaying search results based on the type of search. For example, image search results may be displayed as thumbnail links in rows, while text search results may be displayed as a single column of text links and descriptions.

In some implementations, information area 230 includes information related to the link selected from the first plurality of links in the information area, as described below in step 406 of FIG. 4. In an example, information area 112 of FIG. 1 includes links to related entities. When a selection of one of the related entities is received, the information in information area 230 is updated to display information related to the selected related entity. In some implementations, information in information area 230 is related to the search results displayed in search results area 226. In some implementations, the entity in related entity area 210 is indicated by indictor 220. In an example, entity title 232 includes text similar to "Entity 2 Title" indicating that information is associated with the entity from search query "Entity2" 204.

Figure 3:
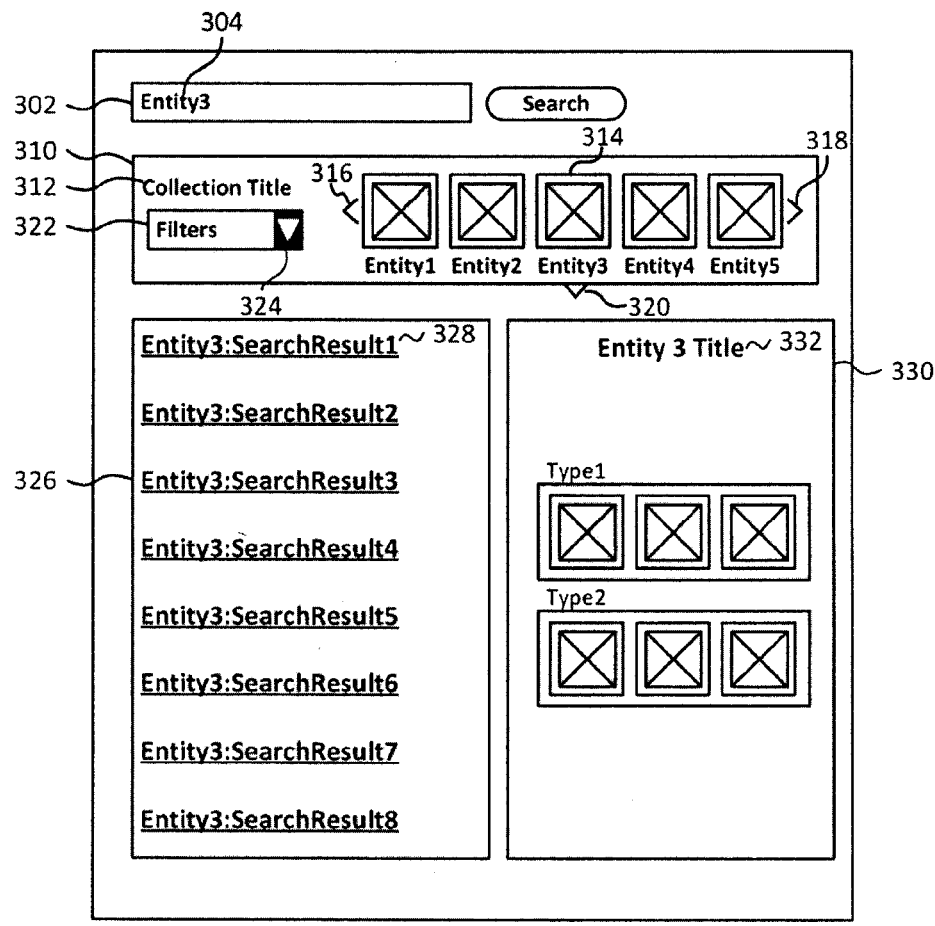
FIG. 3 shows another exemplary user interface in accordance with some implementations of the present disclosure.

FIG. 3 shows exemplary user interface 300 in accordance with some implementations of the present disclosure. In some implementations, user interface 300 illustrates exemplary content displayed in response to receiving a selection of one of the related entity area links, as described below in step 410 of FIG. 4. In some implementations, the search system receives a selection of one of the thumbnail links in related entity area 310, such as "Entity3" link 314. In some implementations, the links displayed in related entity area 310 remains constant while content in the search results area 326 and/or information area 330 is updated in response to receiving selections of links in related entity area 310. In an example, the search system displays five related entity area links as illustrated in related entity area 310 and updates search results repeatedly in response to receiving selections of particular related entity area links. For example, the search system receives a selection of "Entity3" followed by "Entity5" followed by "Entity3" again, and updates displayed search results and other information accordingly.

In some implementations, user interface 300 includes related entity area 310, search results area 326, and information area 330. In some implementations, user interface 300 includes search query box 302 containing search query "Entity3" 304. In some implementations, the search query is related to a link selected from the related entity area links, as described below in step 410 of FIG. 4. For example, where the selected link is "Entity3" link 314, search query "Entity3" 304 relates to the same search topic. It will be understood that the search system may add to, subtract from, rearrange, or otherwise suitable modify a selected link in generating a search query. In some implementations, the search system automatically updates the content displayed within search box 302 following receipt of input indicating a selection of a link.

In some implementations, related entity area 310 includes collection title 312, filters 322, pull down menu 324, scroll arrows 316 and 318 configured to scroll or otherwise reconfigure a carousel of related entities, any other suitable content not shown, or any combination thereof. In some implementations, indicator 320 indicates the selected related entity, for example, "Entity3" 314. In some implementations, selected entities may be indicated by highlighting, shadowing, enlarging, brightening, reconfiguring by any other suitable technique, or any combination thereof. In some implementations, an arrow or icon is displayed to indicate the selection of the link.

In some implementations, search results area 326 displays search results related to the selected entity from the related entity area, as described below in step 412 of FIG. 4. In some implementations, the search results displayed in search results area 326 are related to the search query displayed in search box 302, are related to the entity indicated by indicator 320, are related to an entity selected from one of the displayed plurality of entities, are any other suitable search results, or any combination thereof. In an example, search results area 326 includes search result "Entity3: SearchResult1" 328, which is related to search query "Entity3" 304.

In some implementations, information area 330 includes information related to the link selected from the information area links, as described below in step 410 of FIG. 4. In some implementations, when a selection of one of the related entities area links in related entity area 310 is received, the information in information area 330 displays updated information related to the selected related entity. In some implementations, information in information area 330 is related to the search results displayed in search results area 326 and the entity in related entity area 310 indicated by indicator 320. In an example, entity title 332 includes text similar to "Entity 3 Title," indicating that information is associated with the entity from search query "Entity3" 304.

Figure 4:
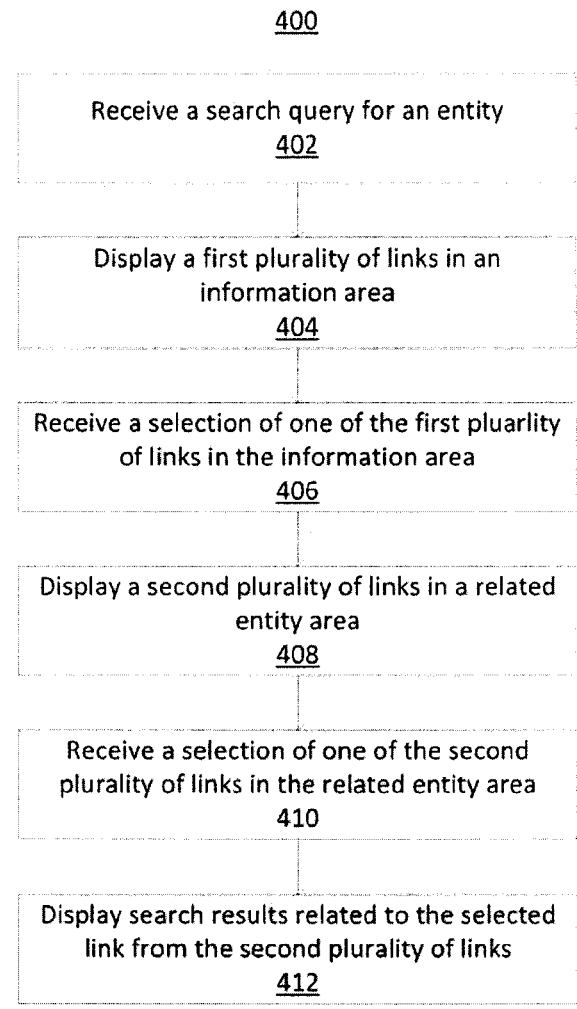
FIG. 4 shows a flow diagram including illustrative steps for displaying search results in response to an entity search in accordance with some implementations of the present disclosure.

FIG. 4 shows flow diagram 400 including illustrative steps for displaying search results in response to an entity search in accordance with some implementations of the present disclosure. In some implementations, the user interface described herein includes an information area, a related entity area, and a search results area. It will be understood that these areas may be disposed on a display screen in any suitable arrangement. It will also be understood that the areas may be resized, rescaled, added, removed, duplicated, switched, rearranged, or otherwise reconfigured in any other suitable way.

In step 402, the search system receives a search query for an entity. In some implementations, the search system receives a search query in the user interface 100 of FIG. 1. In some implementations, the search query is received using a textual search box (e.g., search box 102 of FIG. 1), voice command, image drag-and-drop, gesture recognition, camera input, any other suitable technique, or any combination thereof. The search query may be textual, image-based, audio-based, video-based, of any other suitable format, or any combination thereof.

An entity is a thing that is singular, unique, and distinguishable. For example, an entity may be a person, place, item, idea, abstract concept, concrete element, other suitable thing, or any combination thereof. As used in the search system, an entity generally refers to the concept of the entity. For example, the entity "New York City" refers to the physical city, and the search system uses a concept of the physical city as represented by, for example, an element in a data structure, the name of the entity, any other suitable element, or any combination thereof. In some implementations, a received search query refers to one or more entities. Generally, entities will be distinguished herein from types. As used herein, types refer to a defining characteristic or grouping. For example, "George Washington" and "Thomas Jefferson" are both considered entities of the type "U.S. President." In another example, "China" and "Australia" are considered entities of the type "Country." It will be understood that some entities are associated with more than one type.

In step 404, the search system displays a first plurality of links in an information area. In some implementations, the first plurality of links is referred to as information area links. In some implementations, information area links include information area links 124 of FIG. 1 and information area links 128 of FIG. 1. In some implementations, links in the information area are grouped by type. In an example, the information area may include a row of links of one type, and another row of links of another type. In some implementations, the first plurality of links displayed in the information area includes links to entities related to the identified entity in the search query. The related entities may be of a single type or of several types. For example, where the identified entity is a movie actor, the first plurality of links includes movies in which that actor acted, the actor's common co-stars, any other suitable related entities, or any combination thereof.

In some implementations, the search system displays search results in a search results display area (e.g., display area 108 of FIG. 1) in response to receiving the search query. In some implementations, for example, the search system displays internet search results based on the received search query. In some implementations, content in the search results area is different than content in the information area. For example, content may differ in formatting, displayed information, the number of links displayed, the technique of grouping content, the technique of ordering content, any other suitable differences, or any combination thereof. In an example, the search results area may contain a list of links to web pages and the information area may contain several rows of links to entities, each row pertaining to a particular type.

In step 406, the search system receives a selection of one of the first plurality of links in the information area. In some implementations, the search system receives a selection of one of the information area links displayed in step 404 by mouse, keyboard, voice, touchscreen, any other suitable input, or any combination thereof.

In step 408, the search system displays a second plurality of links in a related entity area. In some implementations, the second plurality of links is referred to as related entity area links. In some implementations, related entity area links are displayed in related entity area 210 of FIG. 2. In some implementations, the related entity area links are all of the same type as the link selected in the information area in step 406. In some implementations, the related entity area links are all related to the entity identified in the received search query. For example, where the information area displays content associated with a movie actor and the selected link from the first plurality of links one of the actor's movies, the related entity area may display links to a collection of the actor's movies. In another example, where the information area displays information related to "George Washington" and the first plurality of links are for entities having a type of "U.S. President," e.g., links for "Thomas Jefferson" and "Abraham Lincoln," the related entity area may display links several U. S. Presidents. The particular number of related entity area links may depend in part on user preferences, predetermined parameters, screen size, the type of link displayed, font sizes, any other suitable parameters, or any combination thereof.

In some implementations, the search system displays related entity area links in a horizontal arrangement. In some implementations, the horizontal arrangement is referred to as a carousel. The links may be thumbnail image links, text links, any other suitable links, or any combination thereof. In some implementations, the horizontal arrangement is scrollable to incrementally display more links. In some implementations, the links are paginated, such that there is, for example, a "show more links" button or link. In some implementations, displayed links are sorted or ordered based on alphabetical ordering, numerical ordering, global search popularity, user preferences, predetermined parameters, any other suitable parameters, or any combination thereof. It will be understood that the aforementioned techniques for scrolling or reconfiguring displayed links are merely exemplary and that any suitable technique may be used. For example, in some implementations the search system arranges links vertically, in a grid, in a matrix, in a list, in any other suitable arrangement, or any combination thereof.

In some implementations, the search system updates the displayed search results based on the selection of one of the information area links. In an example, when a particular information area link is selected from information area 230 of FIG. 2, the links in the related entity area 210 of FIG. 2 are updated to display links to entities of the same type as the selected information area link, and the links in the search result area 226 of FIG. 2 are updated to display links related to the selected information area link.

In some implementations, the information displayed in the information display area 230 of FIG. 2 is updated based on the selected link from the information area link. For example, the search system displays information about the selected entity for which search results are also displayed in the search results area.

In step 410, the search system receives a selection of one of the second plurality of links in the related entity area (e.g., related entity area 210 of FIG. 2). In some implementations, the second plurality of links includes the related entity area links displayed in step 408. In some implementations, receiving a selection includes, as described above, receiving a mouse click, a touchscreen press, any other suitable input, or any combination thereof. In some implementations, the input is received after the related entity area links have been scrolled or otherwise reconfigured to display a desired link.

In some implementations, when the search system receives a subsequent selection of a link in the information area, it updates the links displayed in the related entity area to, for example, entities of the type of the subsequently selected link. In some implementations, an indicator of the selection is displayed. For example, the search system displays the indicated link as highlighted, shadowed, enlarged, brightened, reconfigured by any other suitable technique, or any combination thereof. In some implementations, an arrow or icon is displayed to indicate the selection of the link.

In step 412, the search system displays search results related to the selected link from the second plurality of links. In some implementations, the selected link includes the link selected from the related entity area links in step 410. In some implementations, the second plurality of links is referred to as related entity area links. In some implementations, the search system displays search results in the search result area. In some implementations, search results are displayed in search results area 226 of FIG. 2. In some implementations, search results include the results of sending a search query related to the selected link to a search engine. In some implementations, search results include results from a search of the Internet. In some implementations, information displayed in the information area is updated to display information related to the same entity as the link selected from the related entity area links.

In some implementations, when the search results are displayed in the search results area, the related entity area links remain on the screen. In an example, the search system receives a selection of a related entity area link and displays search results associated with the selected link, and then receives a subsequent selection of a related entity area link and displays search results associated with the subsequently selected link. In some implementations, the related entity area links remain constant throughout. In some implementations, the search system reorders or rearranges the related entity area links. For example, links that have been previously selected may be moved to the right side of the area and continue to be displayed, thus distinguishing explored sets of search results from unexplored sets of search results. In some implementations, for example where filters have been applied or the displayed sets of related entities have been updated, links are provided to previous sets of related entity area links.

It will be understood that the aforementioned steps, and their particular order, is merely exemplary, and that steps may be added, omitted, rearranged, or any combination thereof by any suitable technique. For example, the search system may return to step 402 at any time by receiving a search query in a search box, by receiving a "close" input on the carousel, by any other suitable user input, or any combination thereof. In another example, the search system may receive multiple selections from the first plurality of links in step 406, thus repeating step 406 several times before executing step 408. In another example, the search system may display several sets of search results in response to user input in step 410 and 412, and may then receive a selection of a different type in the information area, returning to step 406.

Figure 5:
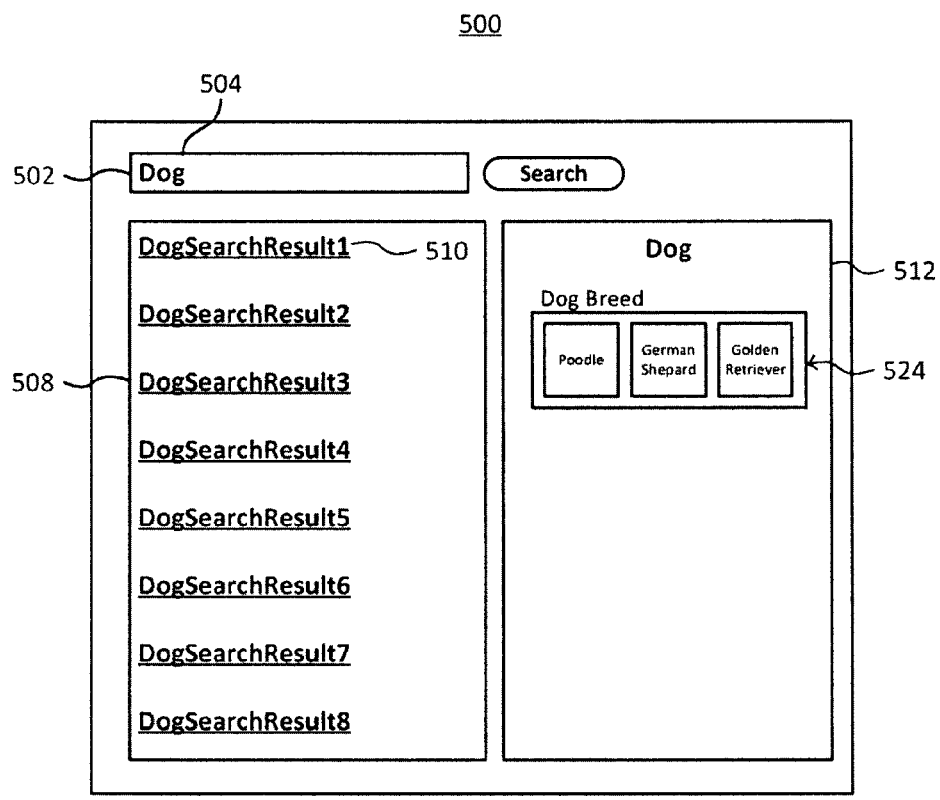
FIG. 5 shows another exemplary user interface in accordance with some implementations of the present disclosure.
Figure 6:
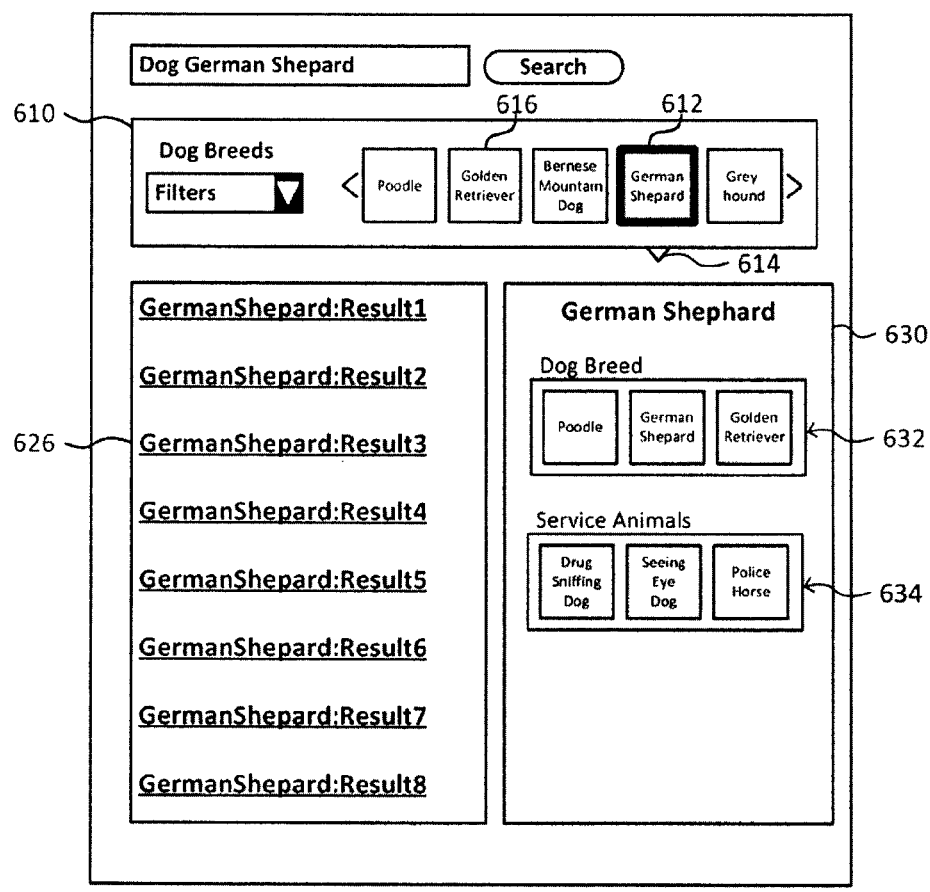
FIG. 6 shows another exemplary user interface in accordance with some implementations of the present disclosure.
Figure 7:
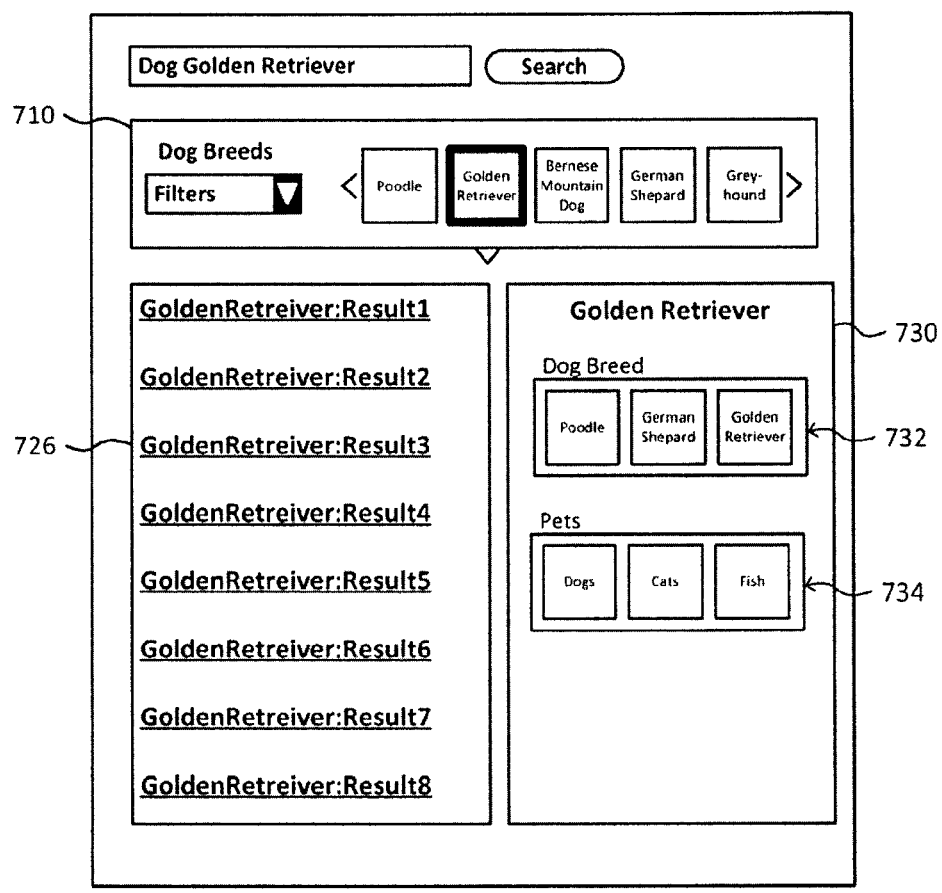
FIG. 7 shows another exemplary user interface in accordance with some implementations of the present disclosure.

In some implementations, FIGS. 5-7 show an example of the steps of flow diagram 400 of FIG. 4.

FIG. 5 shows user 500 interfaces in accordance with some embodiments of the present disclosure. In some implementations, the search result system receives the search query "Dog" 504 in search box 502, as described in step 402 of FIG. 4. The search system may display search results for the search query "Dog" 504 in search results area 508 such as "DogSearchResult1" 510, and may display information related to the entity "Dog" in information area 512. Information area 512 may include information area links to related queries, as described in step 404 of FIG. 4. For example, information area links 524 may be of the type "Dog Breed" and may include links to three particular dog breeds such as a Poodle, a German Shepherd, and a Golden Retriever. The search system may receive a selection of a link "German Shepherd," from information area links 524 as described in step 406 of FIG. 4.

FIG. 6 shows user interface 600 in accordance with some embodiments of the present disclosure. In some implementations, user interface 600 includes exemplary content displayed in response to receiving a selection of a "German Shepherd" link from information area links 524 of FIG. 5. The search system may display related entity area links of the type "dog breed" in a related entity area, for example, related entity area 610, as described in step 408 of FIG. 4. As the entity "German Shepherd" may be initially selected in the related entity area, search results may be displayed related to the entity "German Shepherd" may be displayed in search results area 626, and information related to the entity "German Shepherd" may be displayed in information area 630. Information area 630 may include links to other types of entities such as information area links 632 to entities of the type "dog breed" and information area links 634 to entities of the type "Service Animals." The related entity area may display a plurality of links to related entities of the same type. For example, related entity area may display links to "Bernese Mountain Dog," "Poodle," Golden Retriever," "German Shepherd," and "Greyhound." In the illustrated example, the selected "German Shepherd" entity 612 in the related entity area is indicated by a bold outline and arrow indicator 614. It will be understood that the search system may use any suitable indicator or indicators. The search results system, for example, receives a selection of "Golden Retriever" entity link 616 from the related entity area, as described in step 410 of FIG. 4.

FIG. 7 shows user 700 interfaces in accordance with some embodiments of the present disclosure. In some implementations, user interface 700 includes exemplary content displayed in response to receiving a selection of a "Golden Retriever" entity link 616 of FIG. 6 from related entity area 610 of FIG. 6. The search system may update the search results to search results associated with the query "Golden Retriever" in search results area 726 of FIG. 7 associated with the entity selected in the related entity area 710, as described in step 412 of FIG. 4. The search system may also update the information displayed in information area 730 of FIG. 3 to display information related to the entity "Golden Retriever."

The related entities of related information area 610 of FIG. 6 and 710 of FIG. 7 may remain throughout browsing the sets of search results, such that the search results set for "German Shepherd" shown in search results area 626 of FIG. 6 can easily be returned to after browsing the "Golden Retriever" set of search results shown in search results area 726 of FIG. 7.

Figure 8:
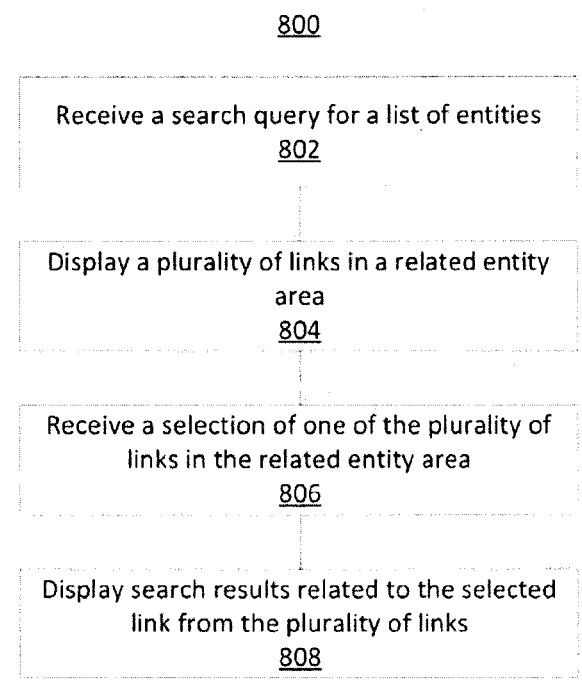
FIG. 8 shows a flow diagram including illustrative steps for displaying search results in response to a list search in accordance with some implementations of the present disclosure.

FIG. 8 shows flow diagram 800 including illustrative steps for displaying search results in response to a list search in accordance with some implementations of the present disclosure. In some implementations, the search system displays results as they are displayed starting at step 408 of FIG. 4. In some implementations, search results and related links as described in flow diagram 800 are displayed in a user interface such as that illustrated in user interface 200 of FIG. 2. It will be understood that the user interface 200 of FIG. 2 is merely exemplary and that any suitable user interface may be used.

In some implementations, the user interface described herein includes an information area, a related entity area, and a search results area. It will be understood that these areas are disposed on a display screen in any suitable arrangement. It will also be understood that the areas may be resized, rescaled, added, removed, duplicated, switched, rearranged, reconfigured in any other suitable technique, or any combination thereof.

In step 802, the search system receives a search query for a list of entities. In some implementations, the search query is received using a textual search box (e.g., search box 202 of FIG. 2), voice command, image drag-and-drop, gesture recognition, camera input, any other suitable technique, or any combination thereof. In some implementations, the first search query is a textual search query, image search query, audio search query, video search query, of any other suitable format, or any combination thereof.

In some implementations, a search for a list of entities includes a search query that implicitly or explicitly identifies a type. As used herein, types refer to defining characteristics or groupings of a topic or entity. For example, "dog" and "cat" are both entities of the type "pet." In another example, "The Great Gatsby" and "The Catcher in the Rye" are entities of the type "book." In some implementations, the type is identified from the received search query. An explicit type in a search for a list of entities may include, for example, "Movies by Tom Hanks" or "Cities in Europe." An implicit list query may include "U. S. Presidency" or "Horror Movies," where the type is included but not as readily identifiable and/or set off by a preposition. In some implementations, the search system receives an entity query and automatically selects a type from several possible types based on, for example, popularity or search history. For example, the search system may automatically select a type based on an entity when it is very confident of the type to desire, such as when there is only one type associated with an entity.

In step 804, the search system displays a plurality of links in a related entity area. In some implementations, the plurality of links is referred to as related entity area links. In some implementations, related entity area links are displayed in related entity area 210 of FIG. 2. In some implementations, the related entity area links are all of the same type as the type indicated explicitly or implicitly in the received search query of step 802. For example, where the received query is "Movies by Tom Hanks," the related entity area links may include links to a collection of Tom Hanks' movies. In another example, where the received search query is "U. S. Presidency," the related entity area links may include links to five to ten U. S. Presidents. In some implementations, the particular number related entity area links displayed in the related entity area depends in part on user preferences, predetermined parameters, screen size, the type of link displayed, font sizes, any other suitable parameters, or any combination thereof.

In some implementations, the search system displays related entity area links in a horizontal arrangement. In some implementations, the horizontal arrangement is referred to as a carousel. In some implementations, the links include thumbnail image links, text links, any other suitable links, or any combination thereof. In some implementations, the horizontal arrangement is scrollable to incrementally display more links. It will be understood that the horizontal scrollable arrangement of links is merely exemplary and that the search system may display links in any suitable arrangement. For example, the search system may arrange links vertically, in a grid, in a matrix, in a list, in any other suitable arrangement, or any combination thereof. In some implementations, the links are paginated, such that there is, for example, a "show more links" button or link. In some implementations, displayed links are sorted or ordered based on alphabetical ordering, numerical ordering, global search popularity, user preferences, predetermined parameters, any other suitable parameters, or any combination thereof. It will be understood that the aforementioned techniques for scrolling or reconfiguring displayed links are merely exemplary and that any suitable technique may be used.

In some implementations, the search system initially displays search results based on the received search query, and updates the displayed search results based on user input. In some implementations, the search system initially displays information in an information display area (e.g., information area 230 of FIG. 2) based on an entity identified in the received search query, and updates the displayed information based on user input. For example, where the received list search query is "Movies with Tom Hanks," the information area may display information related to "Tom Hanks." In another example, where the received list search query is "dog breeds," the information area may display information related to the animal "dog." In another implementation, the information area may display information related to the most popular entity of the displayed entity type.

In step 806, the search system receives a selection of one of the plurality of links in the related entity area. In some implementations, the plurality of links is referred to as related entity area links. In some implementations, receiving a selection includes, as described above, receiving a mouse click, a touchscreen press, any other suitable input, or any combination thereof. In some implementations, the input is received after the related entity area links have been scrolled or otherwise reconfigured to display a desired link. In some implementations, the search system receives a second selection of a link in the information area and updates the links displayed in the related entity area to, for example, entities of a different type. In some implementations, an indicator of the selection is displayed. For example, the search system displays the indicated link as highlighted, shadowed, enlarged, brightened, reconfigured by any other suitable technique, or any combination thereof. In some implementations, an arrow or icon is displayed to indicate the selection of the link.

In step 808, the search system displays search results related to the selected link from the plurality of links in the related entity area. In some implementations, the plurality of links is referred to as related entity area links. In some implementations, related entity area links are displayed in related entity area 226 of FIG. 2. In some implementations, the selected link includes the link selected from the related entity area links in step 806. In some implementations, search results are displayed in the search results area. In some implementations, search results include the results of sending a search query included or related to the selected link to a search engine. For example, search results may include results from a search of the Internet. In some implementations, the search system updates information displayed in the information area to display information related to the same entity as the link selected from the related entity area links.

In some implementations, when the search results are displayed in the search results area, the second plurality of links displayed in the related entity area remain on the screen. In an example, the search system receives a selection of a related entity area link and displays search results associated with the link, and then receives a selection of another related entity area link from the related entity area and displays search results associated with the newly selected link. In some implementations, the related entity area links remain constant throughout displaying search results for multiple related entity area links. In some implementations, the search system reorders or rearranges the plurality of links in the related entity area. For example, links that have been previously selected may be moved to the right side of the area and continue to be displayed, thus distinguishing explored sets of search results from unexplored sets of search results. In some implementations, for example where filters have been applied or the displayed sets of related entities have been updated, links are provided to previous sets of related entities.

It will be understood that the aforementioned steps, and their particular order, is merely exemplary, and that steps may be added, omitted, rearranged, or any combination thereof by any suitable technique. For example, the search system may return to step 802 at any time by receiving a search query. In an example, the search system may display several sets of search results in response to user input in step 806 and 808, and may then receive a selection of a different type from links displayed in the information area, thus returning to step 804. For example, where the received search query is "Dog Breeds," the search system may display in the related entity area a plurality of links to dog breeds. Following receiving the selection of "Greyhound," the information area may display related entities of other types, for example, dog competitions such as "Dog Show," "Dog Long Jump," and "Sled Dog Racing." The search system may receive a selection of an entity of a different type in the information area and then may update the links displayed in the related entity area to links of the newly selected type.

In some implementations, FIGS. 9-13 show an example of the steps of flow diagram 800 of FIG. 8.

Figure 9:
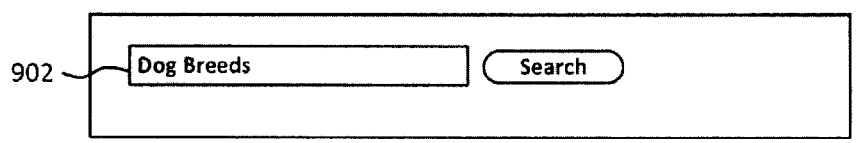
FIG. 9 shows another exemplary user interface in accordance with some implementations of the present disclosure.

FIG. 9 shows user interface 900 in accordance with some embodiments of the present disclosure. In some implementations, the search system receives the search query "Dog Breeds" in search query box 902, as described in step 802 of FIG. 8.

Figure 10:
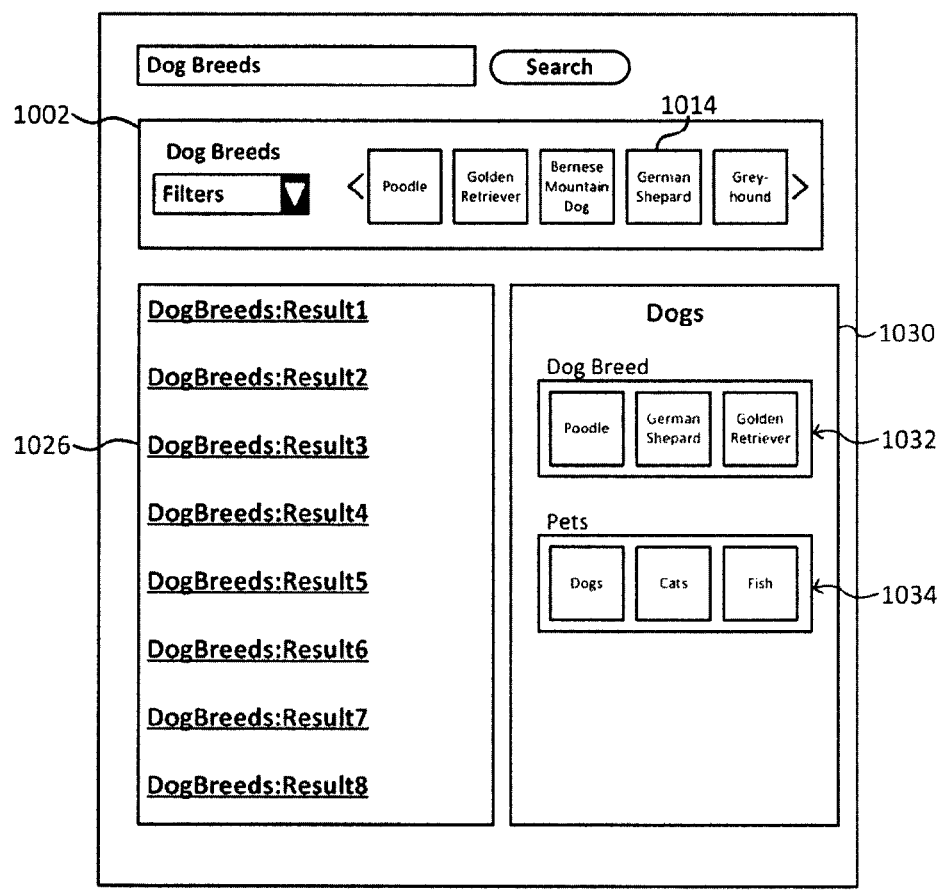
FIG. 10 shows another exemplary user interface in accordance with some implementations of the present disclosure.

FIG. 10 shows user interface 1000 in accordance with some embodiments of the present disclosure. In some implementations, user interface 1000 includes exemplary content displayed in response to receiving a search query "Dog Breeds" in search query box 902 of FIG. 9. In some implementations, the search system displays related entity area links in the related entity area 1002, as described in step 804 of FIG. 8, including "Bernese Mountain Dog," "Poodle," Golden Retriever," "German Shepherd," and "Greyhound." The search system displays search results related to the query "Dog Breeds" in a search result area 1026. The search system displays information related to the entity "Dogs" in an information area, for example information area 1030. Information area may include links to other types of entities such as information area links 1032 to entities of the type "dog breed" and information area links 1034 to entities of the type "Service Animals."

Figure 11:
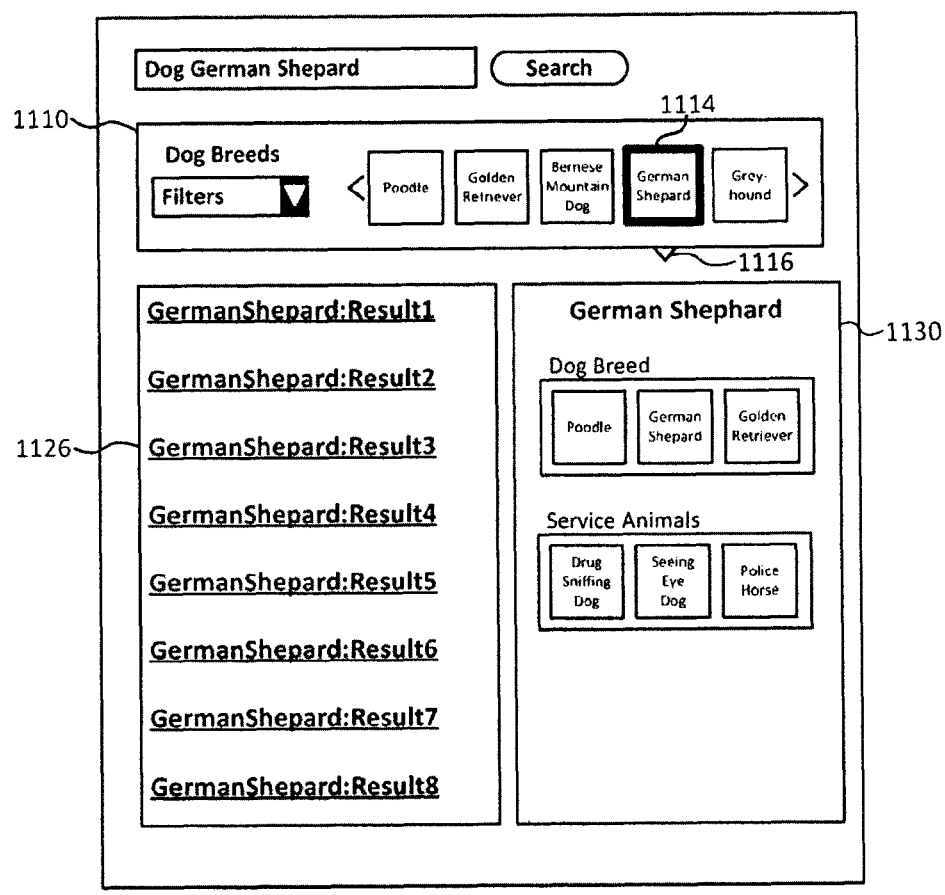
FIG. 11 shows another exemplary user interface in accordance with some implementations of the present disclosure.

FIG. 11 shows user interface 1100 in accordance with some embodiments of the present disclosure. In some implementations, user interface 1100 includes exemplary content displayed in response to receiving a selection of "German Shepherd" entity 1014 of FIG. 10 from the related entity area, as described in step 806 of FIG. 8. In some implementations, search results area 1126 and information area 1130 are updated accordingly, as described in step 808 of FIG. 8. In some implementations, the search system displays indicator 1116 indicating the selection of "German Shepherd" entity link 1114 in related entity area 1110. In some implementations, the particular related entities remain throughout browsing the sets of search results, such that the search results set for "German Shepherd" is easily returned to after browsing the "Greyhound" and "Bernese Mountain Dog" sets of search results.

Figure 12:
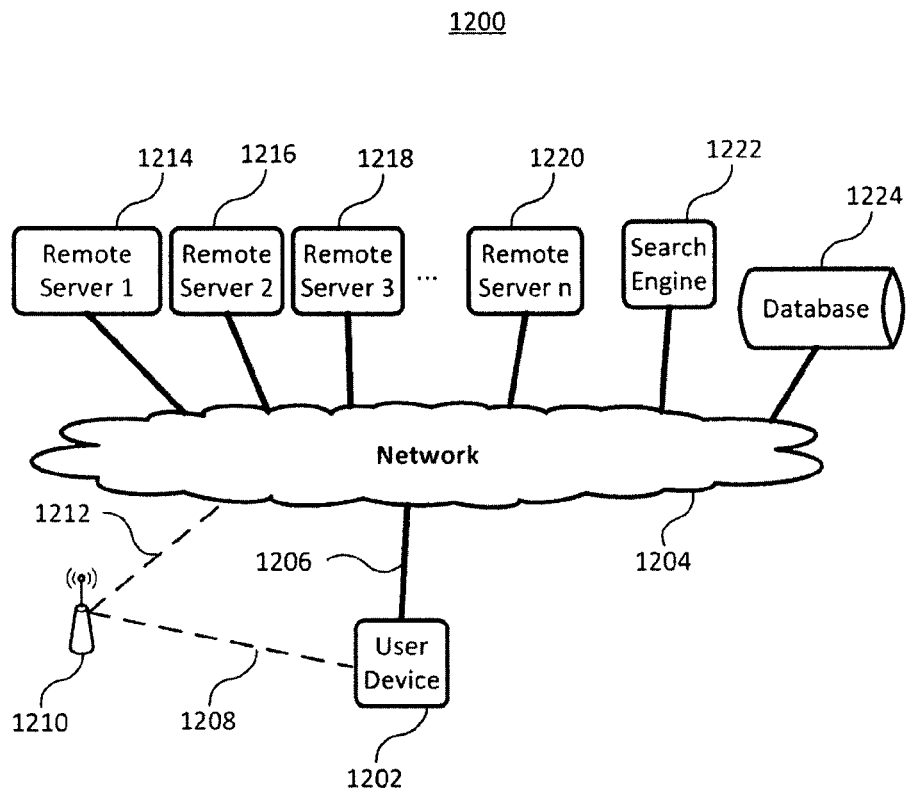
FIG. 12 shows an illustrative computer system that may be used to implement some or all features of the search system in accordance with some implementations of the present disclosure.
Figure 13:
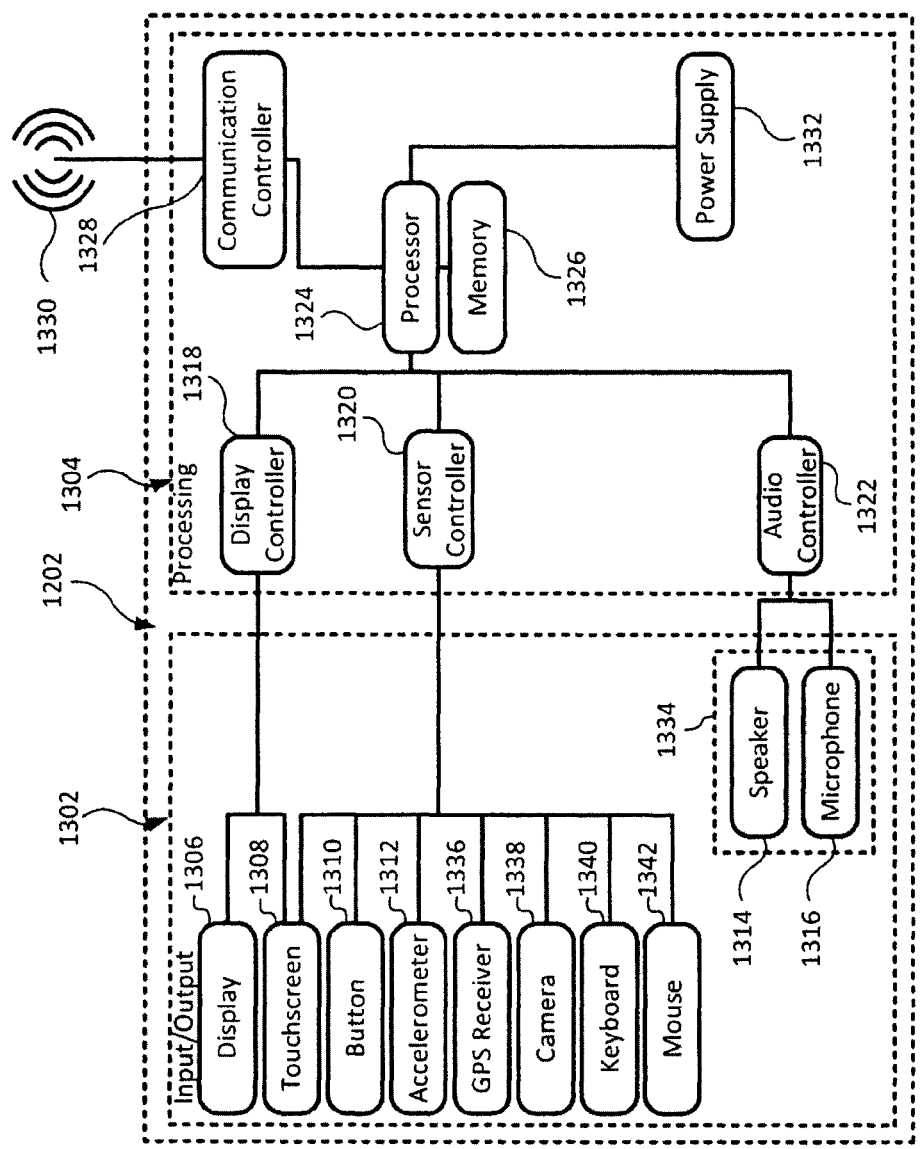
FIG. 13 is a block diagram of a user device in accordance with some implementations of the present disclosure.

FIGS. 12 and 13 describe illustrative computer systems that may be used in some implementations of the present disclosure. It will be understood that the search system of the present disclosure and associated techniques discussed herein or otherwise may be implemented on any suitable software, hardware, or both. The search system may be, for example, implemented on a single computer or across multiple computers or other hardware platforms.

FIG. 12 shows an illustrative computer system 1200 that may be used to implement some or all features of the search system in accordance with some implementations of the present disclosure. In some implementations, system 1200 includes one or more user device 1202. In some implementations, user device 1202 includes a smartphone, tablet computer, desktop computer, laptop computer, personal digital assistant (PDA), portable audio player, portable video player, mobile gaming device, other suitable user device capable of providing content, or any combination thereof.

In some implementations, user device 1202 is coupled to network 1204 directly through connection 1206, through wireless repeater 1210, by any other suitable way of coupling to network 1204, or by any combination thereof. In some implementations, network 1204 includes the Internet, a dispersed network of computers and servers, a local network, a public intranet, a private intranet, other coupled computing systems, or any combination thereof.

In some implementations, user device 1202 is coupled to network 1204 by wired connection 1206. In some implementations, connection 1206 includes Ethernet hardware, coaxial cable hardware, DSL hardware, T-1 hardware, fiber optic hardware, analog phone line hardware, any other suitable wired hardware capable of communicating, or any combination thereof. Connection 1206 may include transmission techniques including TCP/IP transmission techniques, IEEE 802 transmission techniques, Ethernet transmission techniques, DSL transmission techniques, fiber optic transmission techniques, ITU-T transmission techniques, any other suitable transmission techniques, or any combination thereof.

In some implementations, user device 1202 is wirelessly coupled to network 1204 by wireless connection 1208. In some implementations, wireless repeater 1210 receives transmitted information from user device 1202 by wireless connection 1208 and communicates it with network 1204 by connection 1212. In some implementations, wireless repeater 1210 receives information from network 1204 by connection 1212 and communicates it with user device 1202 by wireless connection 1208. In some implementations, wireless connection 1208 includes cellular phone transmission techniques, code division multiple access (CDMA) transmission techniques, global system for mobile communications (GSM) transmission techniques, general packet radio service (GPRS) transmission techniques, satellite transmission techniques, infrared transmission techniques, Bluetooth transmission techniques, Wi-Fi transmission techniques, WiMax transmission techniques, any other suitable transmission techniques, or any combination thereof.

In some implementations, connection 1212 includes Ethernet hardware, coaxial cable hardware, DSL hardware, T-1 hardware, fiber optic hardware, analog phone line hardware, wireless hardware, any other suitable hardware capable of communicating, or any combination thereof. In some implementations, connection 1212 includes wired transmission techniques including TCP/IP transmission techniques, IEEE 802 transmission techniques, Ethernet transmission techniques, DSL transmission techniques, fiber optic transmission techniques, ITU-T transmission techniques, any other suitable transmission techniques, or any combination thereof. In some implementations, connection 1212 includes wireless transmission techniques including cellular phone transmission techniques, code division multiple access (CDMA) transmission techniques, global system for mobile communications (GSM) transmission techniques, general packet radio service (GPRS) transmission techniques, satellite transmission techniques, infrared transmission techniques, Bluetooth transmission techniques, Wi-Fi transmission techniques, WiMax transmission techniques, any other suitable transmission techniques, or any combination thereof.

In some implementations, wireless repeater 1210 includes any number of cellular phone transceivers, network routers, network switches, communication satellites, other devices for communicating information from user device 1202 to network 1204, or any combination thereof. It will be understood that the particular arrangement of connection 1206, wireless connection 1208 and connection 1212 shown in system 1200 is merely illustrative and that system 1200 may include any suitable number of any suitable devices coupling user device 1202 to network 1204. It will also be understood that any user device 1202, may be communicatively coupled with any user device, remote server, local server, any other suitable processing equipment, or any combination thereof, and may be coupled using any suitable technique as described above.

In some implementations, any suitable number of remote servers 1214, 1216, 1218, 1220, are coupled to network 1204. Remote servers may be general purpose, specific, or any combination thereof. In some implementations, one or more search engine servers 1222 are coupled to the network 1204. In some implementations, one or more database servers 1224 are coupled to network 1204. It will be understood that in some implementations the system uses any suitable number of general purpose, specific purpose, storage, processing, search, any other suitable server, or any combination.

FIG. 13 is a block diagram of a user device of the illustrative computer system of FIG. 12 in accordance with some implementations of the present disclosure. In some implementations, user device 1202 includes input/output equipment 1302 and processing equipment 1304. In some implementations, input/output equipment 1302 includes display 1306, touchscreen 1308, button 1310, accelerometer 1312, global positions system (GPS) receiver 1336, camera 1338, keyboard 1340, mouse 1342, and audio equipment 1334 including speaker 1314 and microphone 1316. In some implementations, the equipment illustrated in FIG. 13 is representative of equipment included in a smartphone user device. It will be understood that the specific equipment included in the illustrative computer system may depend on the type of user device. For example, the input/output equipment 1302 of a desktop computer may include a keyboard 1340 and mouse 1342 and may omit accelerometer 1312 and GPS receiver 1336. It will be understood that user device 1202 may omit any suitable illustrated elements, and may include equipment not shown such as media drives, data storage, communication devices, display devices, processing equipment, any other suitable equipment, or any combination thereof.

In some implementations, display 1306 includes a liquid crystal display, light emitting diode display, organic light emitting diode display, amorphous organic light emitting diode display, plasma display, cathode ray tube display, projector display, any other suitable type of display capable of displaying content, or any combination thereof. In some implementations, display 1306 is controlled by display controller 1318 or by processor 1324 in processing equipment 1304, by processing equipment internal to display 1306, by other controlling equipment, or by any combination thereof.

In some implementations, touchscreen 1308 includes a sensor capable of sensing pressure input, capacitance input, resistance input, piezoelectric input, optical input, acoustic input, any other suitable input, or any combination thereof. In some implementations, touchscreen 1308 is capable of receiving touch-based gestures. In some implementations, received gestures include information relating to one or more locations on the surface of touchscreen 1308, pressure of the gesture, speed of the gesture, duration of the gesture, direction of paths traced on its surface by the gesture, motion of the device in relation to the gesture, other suitable information regarding a gesture, or any combination thereof. In some implementations, touchscreen 1308 is optically transparent and located above or below display 1306. In some implementations, touchscreen 1308 is coupled to and controlled by display controller 1318, sensor controller 1320, processor 1324, any other suitable controller, or any combination thereof.

In some embodiments, a gesture received by touchscreen 1308 causes a corresponding display element to be displayed substantially concurrently (i.e., immediately following or with a short delay) by display 1306. For example, when the gesture is a movement of a finger or stylus along the surface of touchscreen 1308, the search system causes a visible line of any suitable thickness, color, or pattern indicating the path of the gesture to be displayed on display 1306. In some implementations, for example, a desktop computer using a mouse, the functions of the touchscreen are fully or partially replaced using a mouse pointer displayed on the display screen.

In some implementations, button 1310 includes one or more electromechanical push-button mechanism, slide mechanism, switch mechanism, rocker mechanism, toggle mechanism, other suitable mechanism, or any combination thereof. In some implementations, button 1310 is included in touchscreen 1308 as a predefined region of the touchscreen (e.g., soft keys). In some implementations, button 1310 is included in touchscreen 1308 as a region of the touchscreen defined by the search system and indicated by display 1306. In some implementations, activation of button 1310 sends a signal to sensor controller 1320, processor 1324, display controller 1320, any other suitable processing equipment, or any combination thereof. In some implementations, activation of button 1310 includes receiving from the user a pushing gesture, sliding gesture, touching gesture, pressing gesture, time-based gesture (e.g., based on the duration of a push), any other suitable gesture, or any combination thereof.

In some implementations, accelerometer 1312 is capable of receiving information about the motion characteristics, acceleration characteristics, orientation characteristics, inclination characteristics and other suitable characteristics, or any combination thereof, of user device 1202. In some implementations, accelerometer 1312 is a mechanical device, microelectromechanical (MEMS) device, nanoelectromechanical (NEMS) device, solid state device, any other suitable sensing device, or any combination thereof. In some implementations, accelerometer 1312 is a 3-axis piezoelectric microelectromechanical integrated circuit which is configured to sense acceleration, orientation, or other suitable characteristics by sensing a change in the capacitance of an internal structure. In some implementations, accelerometer 1312 is coupled to touchscreen 1308 such that information received by accelerometer 1312 with respect to a gesture is used at least in part by processing equipment 1304 to interpret the gesture.

In some implementations, global positioning system (GPS) receiver 1336 is capable of receiving signals from global positioning satellites. In some implementations, GPS receiver 1336 receives information from one or more satellites orbiting the earth, the information including time, orbit, and other information related to the satellite. In some implementations this information is used to calculate the location of user device 1202 on the surface of the earth. In some implementations, GPS receiver 1336 includes a barometer (not shown) to improve the accuracy of the location. In some implementations, GPS receiver 1336 receives information from other wired and wireless communication sources regarding the location of user device 1202. For example, the identity and location of nearby cellular phone towers is used in place of, or in addition to, GPS data to determine the location of user device 1202.

In some implementations, camera 1338 includes one or more sensors to detect light. In some implementations, camera 1338 receives video images, still images, or both. In some implementations, camera 1338 includes a charged coupled device (CCD) sensor, a complementary metal oxide semiconductor (CMOS) sensor, a photocell sensor, an IR sensor, any other suitable sensor, or any combination thereof. In some implementations, camera 1338 includes a device capable of generating light to illuminate a subject, for example, an LED light. In some implementations, camera 1338 communicates information captured by the one or more sensor to sensor controller 1320, to processor 1324, to any other suitable equipment, or any combination thereof. In some implementations, camera 1338 includes lenses, filters, and other suitable optical equipment. It will be understood that user device 1202 includes any suitable number of camera 1338.

In some implementations, audio equipment 1334 includes sensors and processing equipment for receiving and transmitting information using acoustic or pressure waves. In some implementations, speaker 1314 includes equipment to produce acoustic waves in response to a signal. In some implementations, speaker 1314 includes an electroacoustic transducer wherein an electromagnet is coupled to a diaphragm to produce acoustic waves in response to an electrical signal. In some implementations, microphone 1316 includes electroacoustic equipment to convert acoustic signals into electrical signals. In some implementations, a condenser-type microphone uses a diaphragm as a portion of a capacitor such that acoustic waves induce a capacitance change in the device, which is used as an input signal by user device 1202.

In some implementations, speaker 1314 and microphone 121316 are contained within user device 1202, are remote devices coupled to user device 1202 by any suitable wired or wireless connection, or any combination thereof.

In some implementations, speaker 1314 and microphone 1316 of audio equipment 1334 are coupled to audio controller 1322 in processing equipment 1304. In some implementations, this controller sends and receives signals from audio equipment 1334 and performs pre-processing and filtering steps before transmitting signals related to the input signals to processor 1324. In some implementations, speaker 1314 and microphone 1316 are coupled directly to processor 1324. In some implementations, connections from audio equipment 1334 to processing equipment 1304 are wired, wireless, other suitable arrangements for communicating information, or any combination thereof.

In some implementations, processing equipment 1304 of user device 1202 includes display controller 1318, sensor controller 1320, audio controller 1322, processor 1324, memory 1326, communication controller 1328, and power supply 1332.

In some implementations, processor 1324 includes circuitry to interpret signals input to user device 1202 from, for example, touchscreen 1308 and microphone 1316. In some implementations, processor 1324 includes circuitry to control the output to display 1306 and speaker 1314. In some implementations, processor 1324 includes circuitry to carry out instructions of a computer program. In some implementations, processor 1324 is an integrated electronic circuit based, capable of carrying out the instructions of a computer program and include a plurality of inputs and outputs.

In some implementations, processor 1324 is coupled to memory 1326. In some implementations, memory 1326 includes random access memory (RAM), flash memory, programmable read only memory (PROM), erasable programmable read only memory (EPROM), magnetic hard disk drives, magnetic tape cassettes, magnetic floppy disks optical CD-ROM discs, CD-R discs, CD-RW discs, DVD discs, DVD+R discs, DVD-R discs, any other suitable storage medium, or any combination thereof.

In some implementations, the functions of display controller 1318, sensor controller 1320, and audio controller 1322, as have been described above, are fully or partially implemented as discrete components in user device 1202, fully or partially integrated into processor 1324, combined in part or in full into combined control units, or any combination thereof.

In some implementations, communication interface 1328 is coupled to processor 1324 of user device 1202. In some implementations, communication controller 1328 communicates radio frequency signals using antenna 1330. In some implementations, communication controller 1328 communicates signals using a wired connection (not shown). In some implementations, wired and wireless communications communicated by communication interface 1328 uses Ethernet, amplitude modulation, frequency modulation, bit-stream, code division multiple access (CDMA), global system for mobile communications (GSM), general packet radio service (GPRS), satellite, infrared, Bluetooth, Wi-Fi, WiMax, any other suitable communication configuration, or any combination thereof. In some implementations, the functions of communication controller 1328 are fully or partially implemented as a discrete component in user device 1202, are fully or partially included in processor 1324, or any combination thereof.

In some implementations, power supply 1332 is coupled to processor 1324 and to other components of user device 1202. In some implementations, power supply 1332 includes a lithium-polymer battery, lithium-ion battery, NiMH battery, alkaline battery, lead-acid battery, fuel cell, solar panel, thermoelectric generator, any other suitable power source, or any combination thereof. In some implementations, power supply 1332 includes a hard wired connection to an electrical power source, and include suitable electrical equipment to convert the voltage, frequency, and phase of the electrical power source input to power for user device 1202. In an example of power supply 1332, a wall outlet may provide 120 volts, 60 Hz alternating current (AC). A circuit of transformers, resistors, inductors, capacitors, transistors, and other suitable electronic components included in power supply 1332 may convert the 120V AC from a wall outlet power to 5 volts at 0 Hz (i.e., direct current). In another example of power supply 1332, a lithium-ion battery including a lithium metal oxide-based cathode and graphite-based anode may supply 3.7V to the components of user device 1202. In some implementations, power supply 1332 is fully or partially integrated into user device 1202, functions as a stand-alone device, or any combination thereof. In some implementations, power supply 1332 powers user device 1202 directly, powers user device 1202 by charging a battery, provides power by any other suitable technique, or any combination thereof.

The foregoing is merely illustrative of the principles of this disclosure and various modifications may be made by those skilled in the art without departing from the scope of this disclosure. The above described implementations are presented for purposes of illustration and not of limitation. The present disclosure also may take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed:

1. A computer implemented method for providing search results, the method comprising:

receiving a search query for an entity;

responsive to the search query, causing a first plurality of first links to be displayed in an information area of a display screen, the first links corresponding to first related entities, wherein each first link corresponds to a first related entity that is related to the entity of the search query and each first link is associated with an entity type, wherein the display screen includes distinct demarcated regions including, respectively, the information area, a related entity area, and a search result area;

responding to a selection of one of the first links in the information area, the selected first link corresponding to one of the first related entities that is of a particular entity type, by causing a second plurality of second links to be displayed in the related entity area of the display screen, the second links corresponding to second related entities that are related to the entity and wherein each second related entity is of the same entity type as the selected first related entity; and responding to a selection of one of the second links by causing a third plurality of third links that are related to the entity corresponding to the selected second link to be displayed in the search result area of the display screen while the second plurality of second links remain displayed in the related entity area of the display screen.

2. The method of claim 1, further comprising responding to a selection of one of the first links by causing the third plurality of third links to be updated in the search result area, the updated third links corresponding to search results that are related to the selected first link.

3. The method of claim 1, further comprising responding to the selection of one of the first links by causing the first plurality of first links to be updated in the information area, the updated first links corresponding to the related entity of the selected first link.

4. The method of claim 1, further comprising responding to the selection of one of the second links by causing the first plurality of first links to be updated in the information area, the updated first links corresponding to the related entity of the selected second link.

5. The method of claim 1, wherein causing the second plurality of second links to be displayed in the related entity area of the display screen comprises causing the second links to be displayed as images.

6. The method of claim 1, wherein causing the second plurality of second links to be displayed in the related entity area of the display screen comprises causing the second links to be arranged horizontally.

7. The method of claim 1, wherein causing the second plurality of second links to be displayed in the related entity area of the display screen comprises causing the second links to be scrollable.

8. The method of claim 1, wherein the related entity area of the display screen comprises links to previously selected sets of search results.

9. A computer implemented method for providing search results, the method comprising:
   receiving a search query for a list of entities, wherein the search query implicitly or explicitly identifies an entity type;
   causing a plurality of related area links to be displayed in a related entity area of a display screen, each related area link corresponding to a respective entity of the entity type and each related area link obtained by a search system based on the search query;
   responding to a selection of one of the related area links by causing data representing multiple web resources related to the respective entity corresponding to the selected related area link to be displayed in another area of the display screen, while the plurality of related area links remain displayed in the related entity area, wherein the data representing multiple web resources is obtained by the search system based on the selected related area link; and
   responding to a selection of data representing a particular web resource of the multiple web resources, providing for display of the particular web resource on the display screen.

10. The method of claim 9, wherein causing data representing multiple web resources related to the respective entity corresponding to the selected related area link to be displayed in another area of the display screen comprises causing search results to be displayed in a search result area of the display screen.

11. The method of claim 9, wherein causing data representing multiple web resources related to the respective entity corresponding to the selected related area link to be displayed in another area of the display screen comprises causing data to be displayed in an information area of the display screen.

12. The method of claim 9, wherein causing the plurality of related area links to be displayed in the related entity area of the display screen comprises causing the related area links to be displayed as images.

13. The method of claim 9, wherein causing the plurality of related area links to be displayed in the related entity area of the display screen comprises causing the related area links to be arranged horizontally.

14. The method of claim 9, wherein causing the plurality of related area links to be displayed in the related entity area of the display screen comprises causing the related area links to be scrollable.

15. The method of claim 9, wherein the related entity area of the display screen comprises links to previously selected sets of search results.

16. A system comprising one or more computers configured to perform operations including:
   receiving a search query for an entity;
   responsive to the search query, causing a first plurality of first links to be displayed in an information area of a display screen, the first links corresponding to first related entities, wherein each first link corresponds to a first related entity that is related to the entity of the search query and each first link is associated with an entity type, wherein the display screen includes distinct demarcated regions including, respectively, the information area, a related entity area, and a search result area;
   responding to a selection of one of the first links in the information area, the selected first link corresponding to one of the first related entities that is of a particular entity type, by causing a second plurality of second links to be displayed in the related entity area of the display screen, the second links corresponding to second related entities that are related to the entity and wherein each second related entity is of the same entity type as the selected first related entity; and
   responding to a selection of one of the second links by causing a third plurality of third links that are related to the entity corresponding to the selected second link to be displayed in the search result area of the display screen while the second plurality of second links remain displayed in the related entity area of the display screen.

17. The system of claim 16, further comprising responding to the selection of one of the first links by causing the third plurality of third links to be updated in the search result area, the updated third links corresponding to search results that are related to the selected first link.

18. The system of claim 16, further comprising responding to the selection of one of the first links by causing the first plurality of first links to be updated in the information area, the updated first links corresponding to the related entity of the selected first link.

19. The system of claim 16, further comprising responding to the selection of one of the second links by causing the first plurality of first links to be updated in the information area, the updated first links corresponding to the related entity of the selected second link.

20. The system of claim 16, wherein causing the second plurality of second links to be displayed in the related entity area of the display screen comprises causing the second links to be displayed as images.

21. The system of claim 16, wherein causing the second plurality of second links to be displayed in the related entity area of the display screen comprises causing the second links to be arranged horizontally.

22. The system of claim 16, wherein causing the second plurality of second links to be displayed in the related entity area of the display screen comprises causing the second links to be scrollable.

23. The system of claim 16, wherein the related entity area of the display screen comprises links to previously selected sets of search results.

24. A system comprising one or more computers configured to perform operations including:
   receiving a search query for a list of entities, wherein the search query implicitly or explicitly identifies an entity type;
   causing a plurality of related area links to be displayed in a related entity area of a display screen, each related area link corresponding to a respective entity of the entity type and each related area link obtained by a search system based on the search query;
   responding to a selection of one of the related area links by causing data representing multiple web resources related to the respective entity corresponding to the selected related area link to be displayed in another area of the display screen while the plurality of related area links remain displayed in the related entity area, wherein the data representing multiple web resources is obtained by the search system based on the selected related area link; and
   responding to a selection of data representing a particular web resource of the multiple web resources, providing for display of the particular web resource on the display screen.

25. The system of claim 24, wherein causing data representing multiple web resources related to the respective entity corresponding to the selected related area link to be displayed in another area of the display screen comprises causing search results to be displayed in a search result area of the display screen.

26. The system of claim 24, wherein causing data representing multiple web resources related to the respective entity corresponding to the selected related area link to be displayed in another area of the display screen comprises causing data to be displayed in an information area of the display screen.

27. The system of claim 24, wherein causing the plurality of related area links to be displayed in the related entity area of the display screen comprises causing the related area links to be displayed as images.

28. The system of claim 24, wherein causing the plurality of related area links to be displayed in the related entity area of the display screen comprises causing the related area links to be arranged horizontally.

29. The system of claim 24, wherein causing the plurality of related area links to be displayed in the related entity area of the display screen comprises causing the related area to be scrollable.

30. The system of claim 24, wherein the related entity area of the display screen comprises links to previously selected sets of search results.

* * * * *